United States Patent [19]
Williamson, Jr.

[11] 3,733,713
[45] May 22, 1973

[54] APPARATUS FOR PROCESSING A BED OF FLUIDIZED SOLIDS

[76] Inventor: Harry Williamson, Jr., 215 South Main Street, Benton, Ill. 62812

[22] Filed: Apr. 21, 1971

[21] Appl. No.: 136,122

[52] U.S. Cl. .................................34/57 A, 263/21 A
[51] Int. Cl. ..............................................F27b 15/00
[58] Field of Search ......................34/57 A, 57 R, 10; 263/21 A

[56] References Cited

UNITED STATES PATENTS

| | | | |
|---|---|---|---|
| 3,598,374 | 8/1971 | Nauta | 34/57 A X |
| 3,089,251 | 5/1963 | Helbig et al. | 34/57 A |

Primary Examiner—Meyer Perlin
Assistant Examiner—William C. Anderson
Attorney—Cohn & Powell

[57] ABSTRACT

This apparatus includes a processing chamber and a heating chamber separated by a gas permeable partition adapted to support a bed of solids. The solids are fluidized by an upwardly directed gas stream which processes the particles as they flow between the supply and discharge orifices of the processing chamber. An internally disposed gas handling conduit provides a by-pass stack for evacuation of the heated gas during emergencies and scheduled shut-downs. The gas handling conduit also provides a supply line for introducing blending air to the heating chamber to temper the hot gas stream during normal operation. A deflector distributes the blending air in a controlled pattern to the fluidized bed to provide optimum operating temperature conditions.

10 Claims, 1 Drawing Figure

PATENTED MAY 22 1973
3,733,713
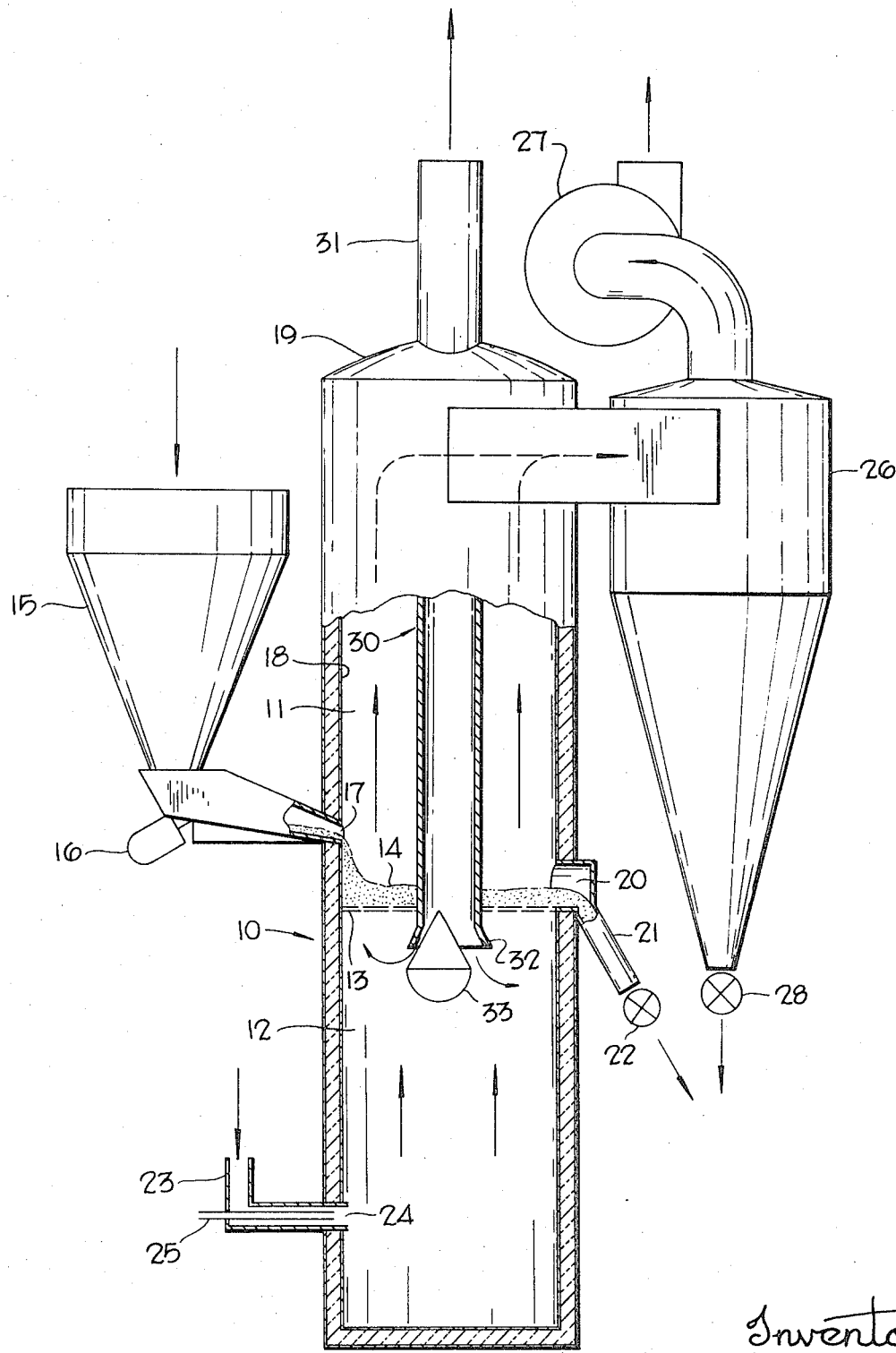
Inventor
HARRY WILLIAMSON, JR.
By Cohn and Powell
Attorneys

APPARATUS FOR PROCESSING A BED OF FLUIDIZED SOLIDS

BACKGROUND OF THE INVENTION

This invention relates in general to an apparatus for processing a bed of fluidized solids by means of a gas stream and in particular to a fluidizing apparatus having an internal blending air conduit controlling the gas temperature pattern.

The processing of a bed of granular material, by passing a gas stream through a permeable partition supporting the material to fluidize the bed so that it flows freely between inlet and outlet stages of the processing apparatus is well known and has found particular application in connection with the drying of wet coal solids.

Most high temperature drying processes require a by-pass stack, which allows the hot gas stream to be diverted to the atmosphere without passing through the material bed at certain periods, for example, during start-up and emergency shut-down. Known fluid bed processes which utilize a by-pass stack locate the stack externally of the drying chamber and, in the apparatus for performing such processes, a horizontal or sloping diverting duct interconnects the heating chamber, which is below the processing chamber, to the external vertical by-pass stack. In a processing system of this kind a remote, automatically operated gate valve is required in the by-pass stack circuit so that no gas can flow through this circuit during normal operation. The effective hot gas evacuation of such a system is poor. Much of the heated gas rises due to the convection through the material bed and, because the bed is no longer fluidized, the material is trapped and subjected to overheating.

In many fluid bed processes, the gas stream is air which is normally supplied to the processor in two parts. The first part is supplied for combustion of the fuel used to provide the heat source, and is introduced in controlled amounts to insure optimum combustion conditions. The second part is supplied as additional air, normally introduced to blend or temper the hot gas stream, and may be introduced through louvers and the like into the combustion chamber.

SUMMARY OF THE INVENTION

This apparatus includes a by-pass stack located within the processing chamber and communicating with the heating chamber to provide optimum efficiency in evacuating the hot gas stream from the heating chamber, during shut-downs and the like.

When such shut-downs occur, the gas is diverted from its normal route through the permeable partition supporting the fluid bed into the by-pass stack. Because the by-pass stack of this apparatus is internally located, it is inherently more effective than an external stack for the reason that the transverse connection between the heating chamber and the stack is eliminated.

During normal operation the internally located stack serves as a conduit to introduce blending air into the heating chamber in a manner which results in a controlled gas temperature pattern below the gas permeable partition. The blending air stream issuing from the conduit is directed by a deflector which controls distribution of blending air to the partition or in other words, into the furnace gas stream. Thus, when the hot gas stream is used as a drying medium, relatively wet material is subjected to relatively high temperature gas. Conversely, less heat is supplied to the material bed area where the particles are relatively dry and closer to discharge. By supplying heat to the material bed in proportion to the fluid content of the bed, higher thermal efficiencies are obtained, and a higher average temperature can be used under the fluid bed if the heat is distributed in proportion to the bed fluid content.

The apparatus includes a casing providing a processing chamber, a heating chamber and a gas permeable partition separating said chambers and adapted to support a bed of solids. The partition is adapted to receive a stream of heated gas emanating from the heating chamber, which fluidizes the bed of solids. The solids are supplied at one side of the processing chamber through an inlet orifice and are discharged from the other side of the processing chamber through an outlet orifice.

A gas handling conduit disposed internally of said processing chamber extends between said heating chamber and the outside atmosphere and includes an orifice communicating with the heating chamber. The conduit is spaced from the sidewalls of the casing and extends upwardly in a substantially vertical orientation to provide a by-pass stack for exhausting the gas stream from the heating chamber at selected periods.

The gas handling conduit is supplied with blending air during normal operation and directs such air to the heating chamber for controlling the temperature pattern of the gas stream. The control means includes a deflector which distributes a controlled amount of air to the gas permeable partition, less air being supplied to the bed of solids on the inlet side than to the bed of solids on the outlet side.

This combined by-pass stack and blending air supply provides a highly efficient and inexpensive gas stream regulator which is relatively simple to manufacture and operate.

BRIEF DESCRIPTION OF THE DRAWING

The drawing is a semi-schematic representation of the processing apparatus.

DESCRIPTION OF THE PREFERRED EMBODIMENT

Referring now by characters of reference to the drawing, it will be understood that the apparatus within which the granular material to be processed, for example dried, consists essentially of a casing 10 divided into an upper drying chamber 11, constituting a solid processing chamber, and a lower furnace chamber 12, constituting a gas heating chamber. The drying and furnace chambers are separated by a gas permeable partition 13, which is adapted to support a bed of material such as wet coal solids generally indicated by numeral 14. A by-pass stack, or conduit, 30 constituting a gas handling conduit, is disposed internally of the casing 10. The conduit 30 is also adapted to supply relatively cool outside blending air to the furnace chamber 12 during normal operation.

Fresh coal solids are supplied to the bed 14 from a hopper 15 by means of a conventional vibrating feeder indicated by numeral 16. The solids enter the drying chamber 11 by means of an inlet orifice 17, and processes solids are discharged from the drying chamber 11 by an outlet orifice 20. The solids are transported from the inlet orifice 17 to the outlet orifice 20 by means of a hot gas stream which is passed through the bed of solids 14, the hot gas stream emanating from the furnace chamber 12. When the gas pressure drop through the bed 14 equals the weight per unit area of the bed, the bed starts to fluidize and, in effect, flows across the drying chamber 11. It will be understood that when the hot gas stream is passed through the bed of solids 14, the amount of surface fluids on the granular particles is reduced considerably by evaporation. Thus wet solids entering the inlet orifice are subjected to a drying process and leave the outlet orifice 20 in a substantially dry condition. A rotary air lock 22 is provided at the end of the outlet passage 21 to prevent air flow at this point.

In the preferred embodiment the gas stream is provided by a stream of heated air, which enters the furnace chamber 12 by means of a combustion air pipe 23 having an air inlet orifice 24. The air permits combustion of fuel, which is supplied to the furnace chamber 12 by a fuel pipe generally indicated by numeral 25, and the heated combustion air forms a gas stream which travels upwardly in the furnace chamber 12, in a direction indicated by the arrows, to pass through the partition 13 into the drying chamber 11. The upper portion of the drying chamber 11 leads to a separator generally indicated by numeral 26, which may be a conventional cyclone separator as shown, or other suitable means for evacuating the gas stream during normal operation and removing dust particles therefrom. It will be understood that the gas stream passes through the separator 26 and is exhausted from the upper end thereof by means of a fan 27. A rotary air lock 28 is provided at the lower end of the separator 26 to prevent air flow at this point.

The gas handline conduit 30 is substantially vertical and centrally disposed within the casing 10, which is defined by a cylindrical sidewall 18 and an upper endwall 19. The conduit 30 includes an upper end 31 projecting outwardly of the casing 10, beyond the endwall 19, and a lower, substantially bell-shaped mouth 32, disposed below the partition 13 and constituting an orifice communicating with the furnace chamber 12. In the preferred embodiment, the conduit 30 extends the full length of the drying chamber 11 and, in effect, extends between the drying chamber 11 and the furnace chamber 12 but without communicating with said drying chamber 11.

The gas handling conduit 30 provides a means of diverting the passage of the gas stream from the drying chamber 11 and hence provides an evacuation route for the gas from the furnace chamber 12 without passing through the bed 14. To this extent the conduit 30 provides a by-pass stack for the gas stream which may be required during start-up, emergency shut-down and also scheduled shut-downs. By-passing the hot gas in this way prevents the material being processed from reaching an ignition temperature, and from undergoing chemical and other undesirable changes. When performing the by-pass function, the conduit 30 receives the gas stream at the bell-shaped mouth 32 and the stream moves upwardly by convection or other means.

During the normal drying operation, the conduit 30 serves to regulate the temperature of the gas stream. The conduit 30 performs this function by drawing tempering or blending air, from an external source, downwardly into the furnace chamber 12. The blending function provides for the commingling of blending air with the hot gas to control the temperature of the gas stream as it passes through the partition 13. In order to provide a controlled gas temperature pattern below the partition 13 so that a higher gas temperature passes through the fluidized bed in the area of the inlet orifice, where the surface moisture of the material solids is relatively high, a conical deflector 33 is provided which projects into the mouth 32 of the conduit 30. In a drying process the blending air is cooler than the gas stream. In order to attain uniform drying conditions across the bed 14, it is desirable to mingle proportionately less blended air to the area of the bed 14 where the material is introduced into the drying chamber 11 than to the discharge are of said bed. To this end, the conical deflector 33 is offset from the exit of the conduit 30 so that a smaller amount of blended air flows in the direction of the inlet orifice 17 than in the direction of the outlet orifice 20. Obviously, by moving the conical deflector 33 relative to the mouth 32, the quantity and direction of the blended air supply can be varied to provide a controlled heat pattern of distribution to the partition 13.

It is thought that the functional advantages and structural features of this fluid bed processing apparatus have become fully apparent from the foregoing description of parts, but for completeness of disclosure, the operation of the apparatus will be briefly summarized.

The gas permeable partition 13 which separates the drying chamber 11 and the furnace chamber 12 includes appertures of a sufficiently small size to retain a particular bed of solids 14. By introducing combustion air into the furnace chamber 12 and supplying said chamber with heat, the combustion air forms a gas stream which travels upwardly and passes through the partition 13 and causes the material bed 14 to fluidize. When the bed 14 fluidizes the granular material flows from the inlet orifice 17 across the drying chamber 11 to the outlet orifice 20. Because of its relatively high temperature the gas stream processes as well as fluidizes the material bed 14 by evaporating surface moisture therefrom.

During normal operation the gas regulating conduit 30 supplies cooling air to the furnace chamber 12 which blends with the hot gas stream and selectively modifies the characteristics thereof in a controlled manner. For example, by means of a conical deflector 33, the amount of blending of tempering air supplied to the bed 14 may be selectively controlled. Thus, the average particle temperature of the solids in the bed 14 may be maintained at an optimum level to evaporate the surface fluids without causing combustion, chemical change or other adverse effects. The distribution of air introduced into the furnace chamber 12 can be controlled by means of louvers of other similar means. However, in the preferred embodiment the control means is provided by the deflector 33 located at the mouth 32 of the gas handling conduit 30.

When it is desirable to divert the gas stream from the furnace chamber 12 substantially without the stream passing into the drying chamber 13 the conduit 30 serves the purpose of a by-pass stack which quickly and efficiently exhausts the hot gas stream from the furnace chamber 12. The internal, vertically disposed and centrally located gas handling conduit 30 therefore performs the dual function of an exhaust and supply system capable of providing optimum heating and drying conditions within the furnace and providing a safety by-pass stack.

When the fan 27 is working, blending air is drawn into the heating chamber 12 through conduit 30. When fan 27 is not working, the gases in the heating chamber 12 are exhausted by convection, upwardly, through the conduit 30.

I claim as my invention:

1. In an apparatus for processing a bed of fluidized solids:
   a. a casing including a solids processing chamber and a gas heating chamber,
   b. means supplying solids to said processing chamber,
   c. means discharging solids from said processing chamber,
   d. means supplying gas to said heating chamber,
   e. a gas permeable partition separating said processing chamber and said heating chamber and adapted to support a bed of solids, said partition being adapted to receive a stream of heated gs therethrough to fluidize said bed of solids,
   f. a gas handling conduit disposed internally of said casing and having an orifice communicating with said heating chamber,
   g. the gas handling conduit passes through the processing chamber to provide a by-pass stack for selectively exhausting the gas stream from the heating chamber.

2. An apparatus as defined in claim 2, in which:
   h. the gas handline conduit passes through the gas permeable partition.

3. An apparatus as defined in claim 3, in which:
   i. the casing includes sidewalls, and
   j. the gas handling conduit is substantially vertically disposed and spaced from said sidewalls.

4. In an apparatus for processing a bed of fluidized solids:
   a. a casing including a solids processing chamber and a gas heating chamber,
   b. means supplying solids to said processing chamber,
   c. means discharging solids from said processing chamber,
   d. means supplying gas to said heating chamber,
   e. a gas permeable partition separating said processing chamber and said heating chamber and adapted to support a bed of solids, said partition being adapted to receive a stream of heated gas therethrough to fluidize said bed of solids,
   f. a gas handling conduit disposed internally of said casing and having an orifice communicating with said heating chamber,
   g. a source of blending air is supplied to the casing,
   h. the gas handling conduit selectively communicates with said source of blending air and directs said air to the heating chamber for selectively controlling the gas-temperature pattern,
   i. control means selectively distributes a controlled amount of blending air from the gas regulating conduit to the gas permeable partition, and
   j. the control means including deflector means disposed in the vicinity of the gas handling conduit orifice to selectively direct air issuing from said conduit orifice.

5. An apparatus as defined in claim 4, in which:
   k. the means supplying solids to the processing chamber include an inlet orifice,
   l. the means discharging solids from the processing chamber include an outlet orifice, and
   m. the deflector is so disposed relative to the axis of the conduit as to supply less blending air to the bed of solids between the inlet orifice and the conduit than to the bed of solids between the outlet orifice and the conduit.

6. In an apparatus for processing a bed of fluidized solids:
   a. a casing including a solids drying chamber and a gas heating chamber,
   b. means supplying solids to said drying chamber,
   c. means discharging solids from said drying chamber,
   d. means supplying gas to said heating chamber,
   e. a gas permeable partition separating said processing chamber of said heating chamber and adapted to support a bed of solids, said partition being adapted to receive a stream of heated gas therethrough to fluidize said bed of solids, and
   f. a gas handling conduit disposed internally of said casing and extending through said drying chamber and into said heating chamber and having an orifice communicating with said heating chamber to provide a by-pass stack selectively exhausting the gas stream from the heating chamber.

7. An apparatus as defined in claim 6, in which:
   g. a source of blending air selectively communicates with the conduit to supply blending air to the heating chamber.

8. An apparatus as defined in claim 7, in which:
   h. the drying chamber includes wall means disposed above the partition,
   i. the gas handling conduit extends through said wall means substantially without communicating with the drying chamber.

9. An apparatus as defined in claim 8, in which:
   j. the casing includes opposed sidewall portions,
   k. the means supplying solids to the drying chamber include an inlet orifice disposed in one of said sidewall portions,
   l. the means discharging solids from the drying chamber include an outlet orifice disposed in the other of said sidewall portions, and
   m. the gas handling conduit is substantially vertically disposed and includes control means selectively distributing a controlled amount of air to the partition, less air being supplied to the vicinity of the inlet orifice than to the vicinity of the outlet orifice.

10. In an apparatus for processing a bed of fluidized solids:
    a. a casing including a solids processing chamber and a gas heating chamber,
    b. means supplying solids to said processing chamber,
    c. means discharging solids from said processing chamber,
    d. means supplying gas to said heating chamber,
    e. a gas permeable partition separating said processing chamber and said heating chamber and adapted to support a bed of solids, said partition being adapted to receive a stream of heated gas therethrough to fluidize said bed of solids,
    f. means having an orifice communicating with the heating chamber below the bed for delivering less blending air under the solids supplying means than under the solids discharge means to determine a heat pattern with varying temperature below the partition so that higher temperature gas passes through the fluidized bed in the vicinity of the solids supplying means than in the vicinity of the solids discharge means to enhance the thermal efficiency.

* * * * *